UNITED STATES PATENT OFFICE.

WILLIAM CROMWELL, OF FLORIDA, ASSIGNOR OF ONE-THIRD TO FRANKLIN J. ENGLISH, OF SPRING VALLEY, NEW YORK.

INSECTICIDE.

SPECIFICATION forming part of Letters Patent No. 375,263, dated December 20, 1887.

Application filed July 20, 1887. Serial No. 244,847. (No specimens.)

*To all whom it may concern:*

Be it known that I, WILLIAM CROMWELL, a citizen of the United States, and a resident of Florida, in the county of Orange and State of New York, have invented certain new and useful Improvements in Composition for Destroying Insects, of which the following is a specification.

My composition consists of the following ingredients combined in the proportion stated—viz., for one gallon of the composition: sumac stalks, one pound; mullein-stalks, one ounce; laurel root, one-fourth pound; poke-berry root, one ounce; fish-brine, one-half peck; kerosene, one-half ounce; nettle-stalks, one ounce; water, five quarts.

The stalk of the sumac, (which is the poisonous variety,) mullein, and nettle, and the root of the laurel and poke-berry are placed in a kettle or other suitable vessel, together with the fish-brine and with the water, and the whole boiled for about an hour, when the mixture is allowed to settle and cool, and the liquid is then drained off, and, if necessary, strained. The kerosene is now added to the mixture and the composition is ready for use.

For use on some plants—as, for instance, on potatoes—the kerosene may advantageously be omitted and the composition be powerful enough to destroy the bugs infecting the plant and yet not injure the potatoes in any manner.

The composition thus prepared may be applied to the plants by sprinkling them, or in any manner found convenient, and may be used to wash the stalks or trunks of shrubs and trees, and may also be applied to the earth around the roots of plants or wherever the bugs or worms are found.

My composition may also be mixed with some suitable absorbent—as meal—and scattered around places infected by bugs, roaches, or any other vermin, and will be found useful for destroying vermin of all kinds wherever found.

The composition causes instant death when the plant on which it is placed, or mixture in which it is contained, is eaten by the bugs or other vermin, and hence is especially desirable for destroying all vermin on plants and shrubs and in houses.

What I claim, and desire to secure by Letters Patent of the United States, is—

1. The herein-described composition of matter to be used for destroying insects and vermin, consisting of sumac, mullein, laurel, poke-berry, fish-brine, kerosene, and nettle, in the proportions specified.

2. The herein-described composition of matter to be used for destroying insects and vermin, consisting of sumac, mullein, laurel, poke-berry, fish-brine, and nettle, in the proportions specified.

Signed at Goshen, in the county of Orange and State of New York, this 18th day of July, A. D. 1887.

his
WILLIAM  ×  CROMWELL.
      mark.

Witnesses:
 JAMES F. HOFFMAN,
 WILLIAM H. WYKER.